US012697982B2

(12) United States Patent
Johnson

(10) Patent No.: US 12,697,982 B2
(45) Date of Patent: Aug. 4, 2026

(54) TECHNIQUES FOR CALCULATING SURFACE BREAKPOINTS FOR SECONDARY SAFETY VERIFICATIONS IN VEHICLE CONTROLS SYSTEMS

(71) Applicant: FCA US LLC, Auburn Hills, MI (US)

(72) Inventor: Andrew D Johnson, Clawson, MI (US)

(73) Assignee: FCA US LLC, Auburn Hills, MI (US)

( * ) Notice: Subject to any disclaimer, the term of this patent is extended or adjusted under 35 U.S.C. 154(b) by 192 days.

(21) Appl. No.: 18/498,208

(22) Filed: Oct. 31, 2023

(65) Prior Publication Data

US 2025/0136123 A1     May 1, 2025

(51) Int. Cl.
*G06F 11/3668*     (2025.01)
*B60W 50/00*     (2006.01)

(52) U.S. Cl.
CPC . *B60W 50/0098* (2013.01); *B60W 2050/0026* (2013.01); *B60W 2050/0088* (2013.01)

(58) Field of Classification Search
CPC .................................................. G06F 11/3668
See application file for complete search history.

(56) References Cited

U.S. PATENT DOCUMENTS 9,723,274 B2     8/2017  Lavoie
10,614,640 B2    4/2020  Gintz et al.

11,458,912 B2    10/2022  Kroeger
11,644,834 B2    5/2023   Ditty et al.
2021/0295171 A1  9/2021   Kamenev et al.
2022/0135059 A1  5/2022   Lim et al.
2022/0244395 A1  8/2022   Chen et al.

FOREIGN PATENT DOCUMENTS

| CN | 102525795 A | * | 7/2012 | |
| CN | 102525795 B | * | 7/2014 | |
| CN | 113238995 A | * | 8/2021 | ............. G06F 16/23 |
| CN | 113734277 A | * | 12/2021 | ........... B62D 5/0466 |
| DE | 60125276 T2 | * | 4/2007 | ............. B60C 11/12 |
| DE | 102023118172 A1 | * | 1/2025 | ............. G06N 3/045 |

* cited by examiner

*Primary Examiner* — Jae U Jeon
(74) *Attorney, Agent, or Firm* — Jeremy J. Klobucar

(57)     ABSTRACT

A calibration technique for a multi-dimensional surface for functional safety verification of a control system of a vehicle involves accessing a memory configured to store operation data relative to the control system of the vehicle, the operation data representing a multi-dimensional surface comprising a plurality of data points, identifying a plurality of breakpoints for representing the multi-dimensional surface based on a maximum allowable number of breakpoints, instantaneous data point slopes, and minimum/maximum breakpoint spacing constraints, and generating a calibrated look-up table for the control system, the calibrated look-up table including the plurality of breakpoints, wherein the calibrated look-up table is configured to be utilized for functional safety verification of an output of the control system.

20 Claims, 5 Drawing Sheets

TECHNIQUES FOR CALCULATING SURFACE BREAKPOINTS FOR SECONDARY SAFETY VERIFICATIONS IN VEHICLE CONTROLS SYSTEMS

FIELD

The present application generally relates to vehicle control systems and, more particularly, to techniques for calculating surface breakpoints for secondary safety verifications in vehicle control systems.

BACKGROUND

Some vehicle control systems utilize complex models (e.g., neural network based models) to generate outputs. In order to satisfy functional safety requirements, the accuracy of this primary output must be checked or verified. Due to processing limitations, this verification is typically a comparison of the output to another secondary output generated using simpler mathematical calculations. When the secondary output confirms that the primary output is of the correct scale, the primary output is verified. One method for verifying more complex model primary outputs is using calibrated look-up tables or multi-dimensional surfaces (2D surfaces, 3D surfaces, etc.). Due to storage limitations, these tables/surfaces are broken down by identifying "breakpoints," which is typically performed by an experienced human calibrator and takes significant time and resources. Accordingly, while such conventional control system safety verification techniques do work well for their intended purpose, there exists an opportunity for improvement in the relevant art.

SUMMARY

According to one example aspect of the invention, a calibration system for a multi-dimensional surface for functional safety verification of a control system of a vehicle is presented. In one exemplary implementation, the calibration system comprises a memory configured to store operation data relative to the control system of the vehicle, the operation data representing a multi-dimensional surface comprising a plurality of data points and a computer system configured to identify a plurality of breakpoints for representing the multi-dimensional surface based on a maximum allowable number of breakpoints, instantaneous data point slopes, and minimum/maximum breakpoint spacing constraints, and generate a calibrated look-up table for the control system, the calibrated look-up table including the plurality of breakpoints, wherein the calibrated look-up table is configured to be utilized for functional safety verification of an output of the control system.

In some implementations, the computer system is further configured to output the calibrated look-up table to the control system, wherein the control system is configured to utilize the calibrated look-up table to perform functional safety verification of the output of the control system. In some implementations, the computer system is further configured to identify the plurality of breakpoints by (i) determining a minimum/maximum step and a slope deviation for identifying a breakpoint. In some implementations, the computer system is further configured to identify the plurality of breakpoints by (ii) determining an instantaneous slope at a first data point and creating a line with the determined instantaneous slope through the first data point. In some implementations, the computer system is further configured to identify the plurality of breakpoints by (iii) stepping to a second data point and comparing a Y-value of the second data point to a Y-value of the created line.

In some implementations, the computer system is further configured to identify the plurality of breakpoints by (iv) identifying the first data point as a breakpoint when the difference between the Y-values of the second data point and the created line is greater than the slope deviation. In some implementations, the computer system is further configured to identify the plurality of breakpoints by continuing identifying breakpoints until the maximum number of breakpoints have been identified In some implementations, the multi-dimensional surface is a two-dimensional (2D) surface. In some implementations, the multi-dimensional surface is a three-dimensional (3D) surface, and wherein the computer system is further configured to divide the 3D surface into a plurality of 2D surfaces. In some implementations, the computer system is further configured to identify the plurality of breakpoints for each of the plurality of 2D surfaces and determine a plurality of breakpoints for the 3D surface by calculating a weighted sum of an average and a maximum of the plurality of breakpoints for the plurality of 2D surfaces, respectively.

According to another example aspect of the invention, a calibration method for a multi-dimensional surface for functional safety verification of a control system of a vehicle is presented. In one exemplary implementation, the calibration method comprises accessing, by a computer system, a memory configured to store operation data relative to the control system of the vehicle, the operation data representing a multi-dimensional surface comprising a plurality of data points, identifying, by the computer system, a plurality of breakpoints for representing the multi-dimensional surface based on a maximum allowable number of breakpoints, instantaneous data point slopes, and minimum/maximum breakpoint spacing constraints, and generating, by the computer system, a calibrated look-up table for the control system, the calibrated look-up table including the plurality of breakpoints, wherein the calibrated look-up table is configured to be utilized for functional safety verification of an output of the control system.

In some implementations, the method further comprises outputting, by the computer system, the calibrated look-up table to the control system, wherein the control system is configured to utilize the calibrated look-up table to perform functional safety verification of the output of the control system. In some implementations, the method further comprises identifying the plurality of breakpoints by (i) determining, by the computer system, a minimum/maximum step and a slope deviation for identifying a breakpoint. In some implementations, the method further comprises identifying the plurality of breakpoints by (ii) determining, by the computer system, an instantaneous slope at a first data point and creating, by the computer system, a line with the determined instantaneous slope through the first data point. In some implementations, the method further comprises identifying the plurality of breakpoints by (iii) stepping, by the computer system, to a second data point and comparing, by the computer system, a Y-value of the second data point to a Y-value of the created line.

In some implementations, the method further comprises identifying the plurality of breakpoints by (iv) identifying, by the computer system, the first data point as a breakpoint when the difference between the Y-values of the second data point and the created line is greater than the slope deviation In some implementations, the method further comprises identifying, by the computer system, the plurality of breakpoints by continuing identifying breakpoints until the maximum number of breakpoints have been identified. In some implementations, the multi-dimensional surface is a 2D surface. In some implementations, the multi-dimensional surface is a 3D surface, and wherein the method further comprises dividing, by the computer system, the 3D surface into a plurality of 2D surfaces In some implementations, the method further comprises Identifying, by the computer system, the plurality of breakpoints for each of the plurality of 2D surfaces and determining, by the computer system, a plurality of breakpoints for the 3D surface by calculating a weighted sum of an average and a maximum of the plurality of breakpoints for the plurality of 2D surfaces, respectively.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, one method for verifying more complex (e.g., neural network based) model outputs is using calibrated look-up tables or multi-dimensional surfaces (2D surfaces, 3D surfaces, etc.). Due to storage limitations, these tables/surfaces are broken down by identifying "breakpoints," which is typically performed by an experienced human calibrator and takes significant time and resources. Thus, an opportunity exists for improvement in the relevant art. Accordingly, calibration techniques for surface breakpoints for secondary safety verifications in vehicle control systems are presented herein. These techniques utilize a memory storing vehicle operation data representing a multi-dimensional surface and a computer system configured to identify a plurality of breakpoints for representing the multi-dimensional surface. This identification is based on, for example, a maximum number of breakpoints, instantaneous slopes of the plurality of data points, and minimum/maximum breakpoint spacing constraints. The calibrated look-up table for the multi-dimensional surface could then be output, such as to the vehicle control system or another vehicle controller for usage in secondary safety verification of a more complex vehicle control system output (e.g., a neural network based output).

Figure 1:
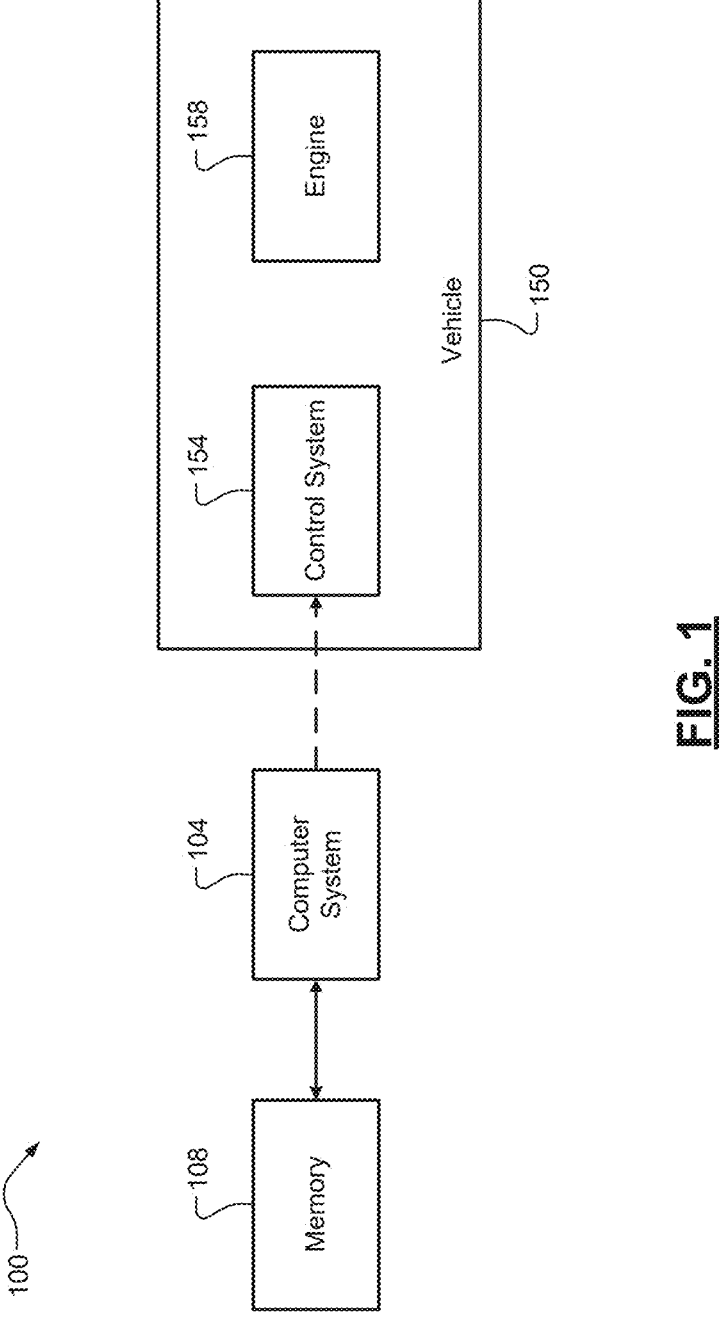
FIG. 1 is a functional block diagram of an example calibration system for a control system of a vehicle according to the principles of the present application.

Referring now to FIG. 1, a functional block diagram of an example calibration system 100 for a surface breakpoint look-up table according to the principles of the present application is illustrated. The calibration system 100 primarily includes a computer system 104 and a memory 108. The memory 108 is configured to store operation data (e.g., test data) relative to a control system 154 of a vehicle 150. The operation data represents a multi-dimensional (e.g., 2D or 3D) surface comprising a plurality of data points. The computer system 104 is configured to analyze the operation data to identify a plurality of breakpoints for representing the multi-dimensional surface. This identification could be based on, for example, a maximum allowable number of breakpoints, instantaneous data point slopes, and minimum/maximum breakpoint spacing constraints. The specific process of identifying the breakpoints is described in greater detail below. After the plurality of breakpoints (e.g., the maximum allowable number of breakpoints) have been identified, the computer system 108 generates and outputs a calibrated look-up table including the plurality of breakpoints.

This calibrated look-up table could then be used by another system to determine values of the corresponding multi-dimensional surface, such as via linear extrapolation (i.e., between neighboring breakpoints). In one implementation, the computer system 108 is configured to output the calibrated look-up table to the control system 154 (or another controller) of the vehicle 100. The control system 154 is then able to use the calibrated look-up table to determine secondary outputs for comparison to primary outputs generated using a more complex model (e.g., a neural network based model). One example of a neural network based model that is utilized by the control system 154 of the vehicle 100 is an airflow model for calculating airflow into an internal combustion engine 158 and the resulting engine torque from the combustion of the air and liquid fuel (gasoline, diesel, etc.). Another example of a neural network based model that is utilized by the control system 154 of the vehicle is a spark timing model for calculating a maximum brake torque (MBT) spark timing, based also on engine speed (revolutions per minute, or RPM) and airflow (manifold absolute pressure, or MAP).

Figure 2A:
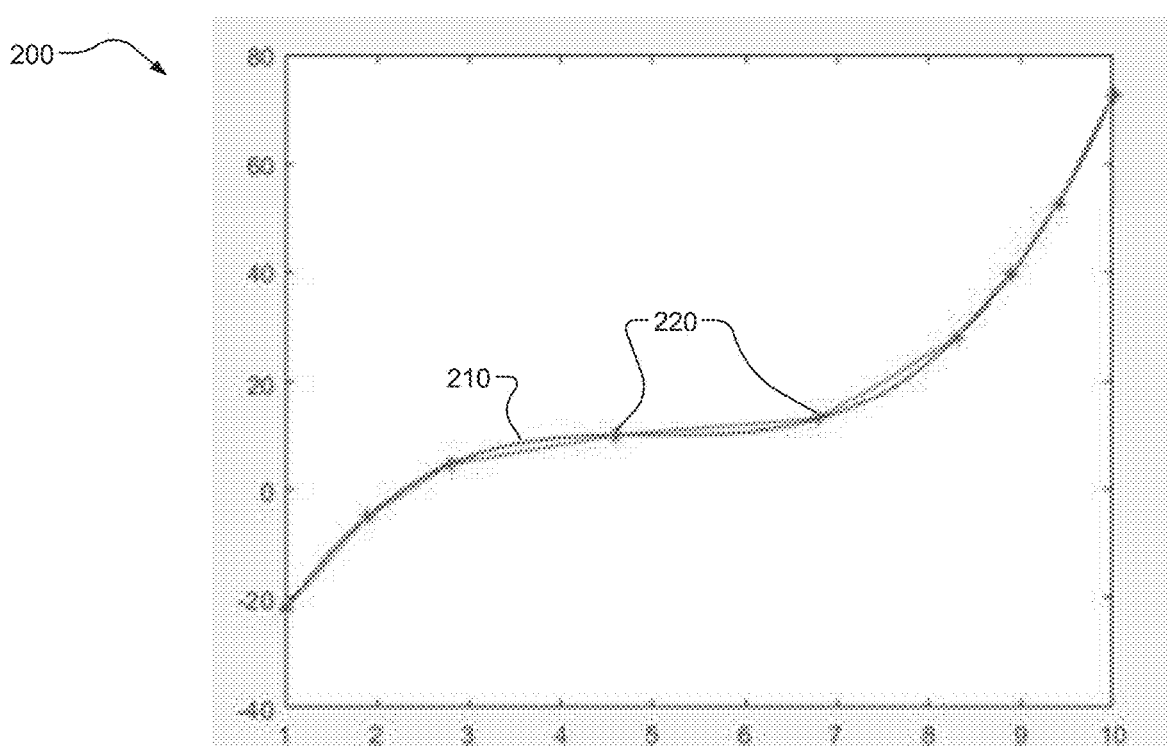
FIGS. 2A-2C are plots of example two-dimensional (2D) and three-dimensional (3D) surfaces and example identified breakpoints according to the principles of the present application.
Figure 2B:
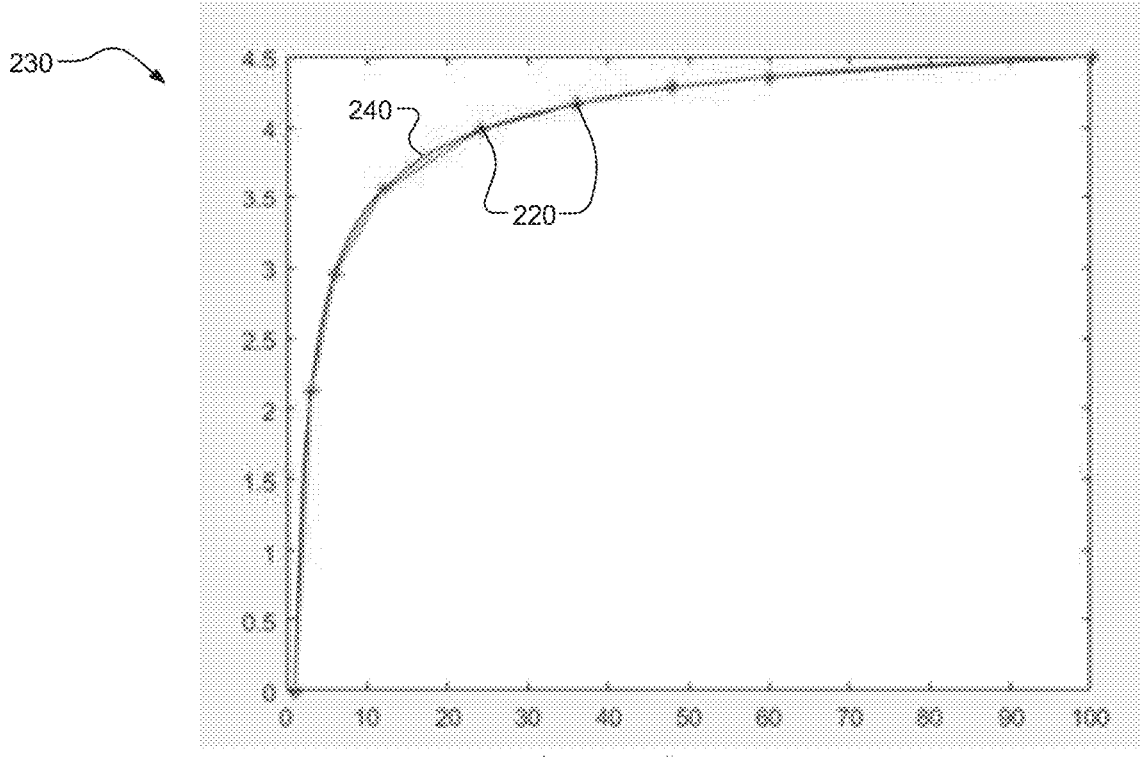
Figure 2C:
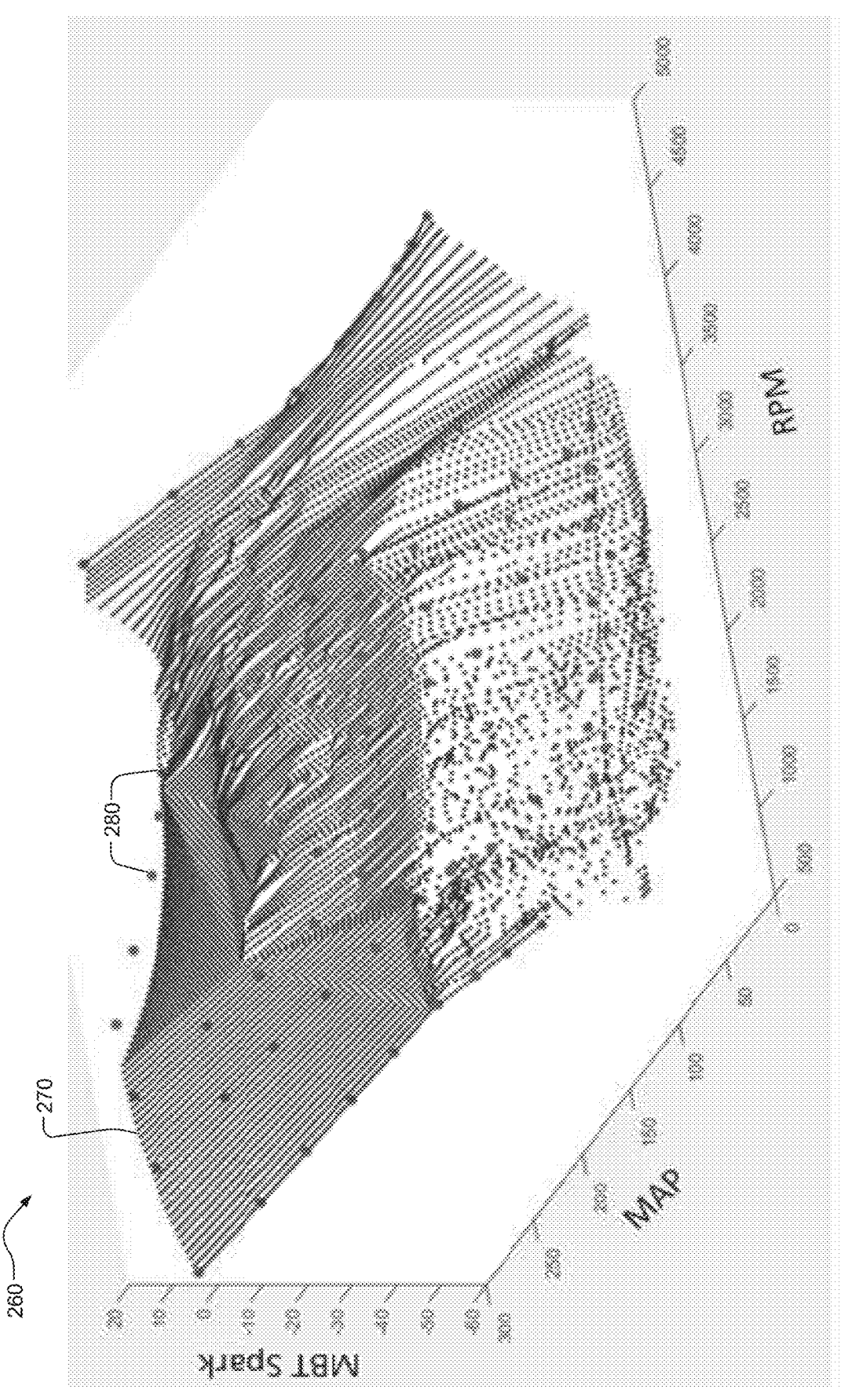

Referring now to FIGS. 2A-2C, plots 200, 230, 260 of two example 2D surfaces 210, 240 and one example 3D surface 270 and example breakpoints 220, 250, 280 respectively, identified using the techniques according to some implementations of the present application are illustrated. In plot 200 of FIG. 2A, the 2D surface 210 corresponds to the polynomial $0.5(x-5)^2+10$ and there are nine (9) identified breakpoints 220. In plot 230 of FIG. 2B, the 2D surface 240 corresponds to the polynomial $5(1-[1/\sqrt{x}])$ and there are again nine (9) identified breakpoints 250. As can be clearly seen, the breakpoints 220 and 250 match/fit the corresponding surfaces 210 and 240 very well. In plot 260 of FIG. 2C, the 3D surface 270 relates MBT spark to MAP and RPM and there are 9×9 (81) identified breakpoints 280. The process for identifying the breakpoints 270 involves dividing the 3D surface 270 into a plurality of 2D surfaces (e.g., nine 2D surfaces), but this process is described in greater detail below. While tougher to visualize compared to the 2D examples of FIGS. 2A-2B, the breakpoints 280 do match/fit the corresponding 3D surface 270 very well.

Figure 3A:
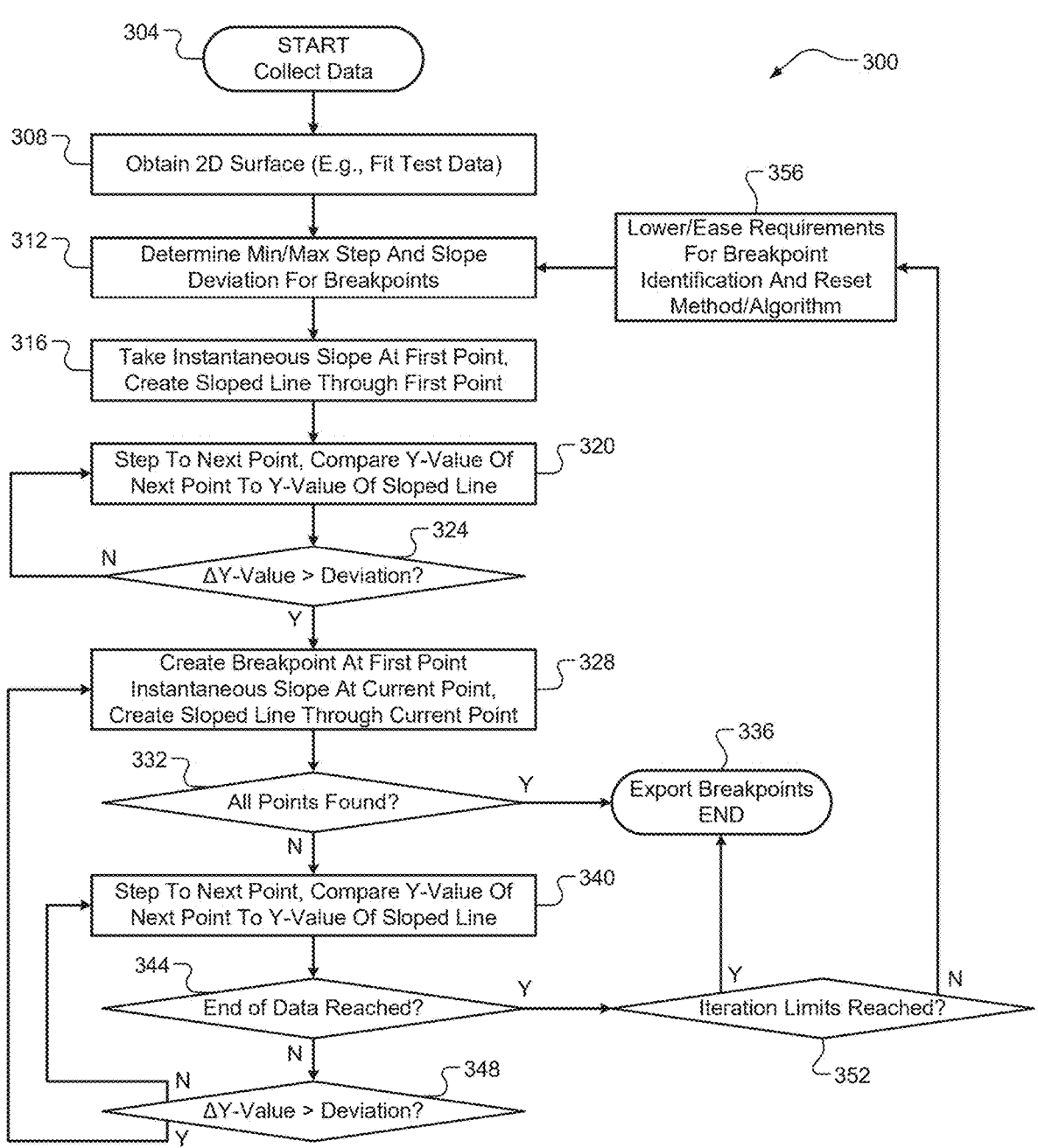
FIG. 3A is a flow diagram of an example two-dimensional (2D) surface breakpoint identification method according to the principles of the present application.

Referring now to FIG. 3A, a flow diagram of an example 2D surface breakpoint identification method 300 according to the principles of the present application is illustrated. The method 300 begins at 304 where the computer system 104 collects the operation data (i.e., the plurality of data points), which could be already stored at the memory 108. At 308, the computer system 104 obtains or fits the data to a 2D surface (e.g., a polynomial curve). At 312, the computer system 104 determines minimum/maximum step sizes and slope deviation for breakpoint identification. A maximum allowable number of breakpoints could also be determined. These constraints could be predetermined or user-specified. At 316, the computer system 104 takes the instantaneous slope at a first point and creates a line having the determined slope therethrough. At 320, the computer system 104 steps to a next point (e.g., a minimum step) and compares a Y-value of this next point to the Y-value of the sloped line. At 324, the computer system 104 determines whether a difference between these Y-values (ΔY-Value) exceeds the slop deviation. When false, a breakpoint is not identified and the method 300 returns to 320. When true, the method 300 proceeds to 328 where a breakpoint is identified at the first point and the instantaneous slope at the current point is determined and a line is created having the determined slope therethrough.

At 332, the computer system 104 determines whether all points (i.e., the maximum allowable number of breakpoints) have been found. When true, the method 300 proceeds to 336 where the identified breakpoints are exported (e.g., to a calibrated look-up table) and the method 300 ends. When false, the method 300 continues to 340. At 340, the computer system 104 steps to a next point and compares the Y-value at the next point to the Y-value of the sloped line. At 344, the computer system 104 determines whether an end of the data has been reached. When false, the method 300 continues to 348. When true, the method 300 proceeds to 352. At 348, the computer system 104 determines whether the ΔY-value exceeds the slope deviation. When false, the method 300 returns to 340. When true, the method 300 returns to 328. At 352, the computer system 104 determines whether a maximum number of iterations (iteration limits) has been reached. When true, the method 300 proceeds to 336. When false, the method 300 continues to 356. At 356, the computer system 104 lowers or eases the requirements for breakpoint identification (min/max step, slope deviation, etc.) and the method/algorithm 300 resets and returns to 312.

Figure 3B:
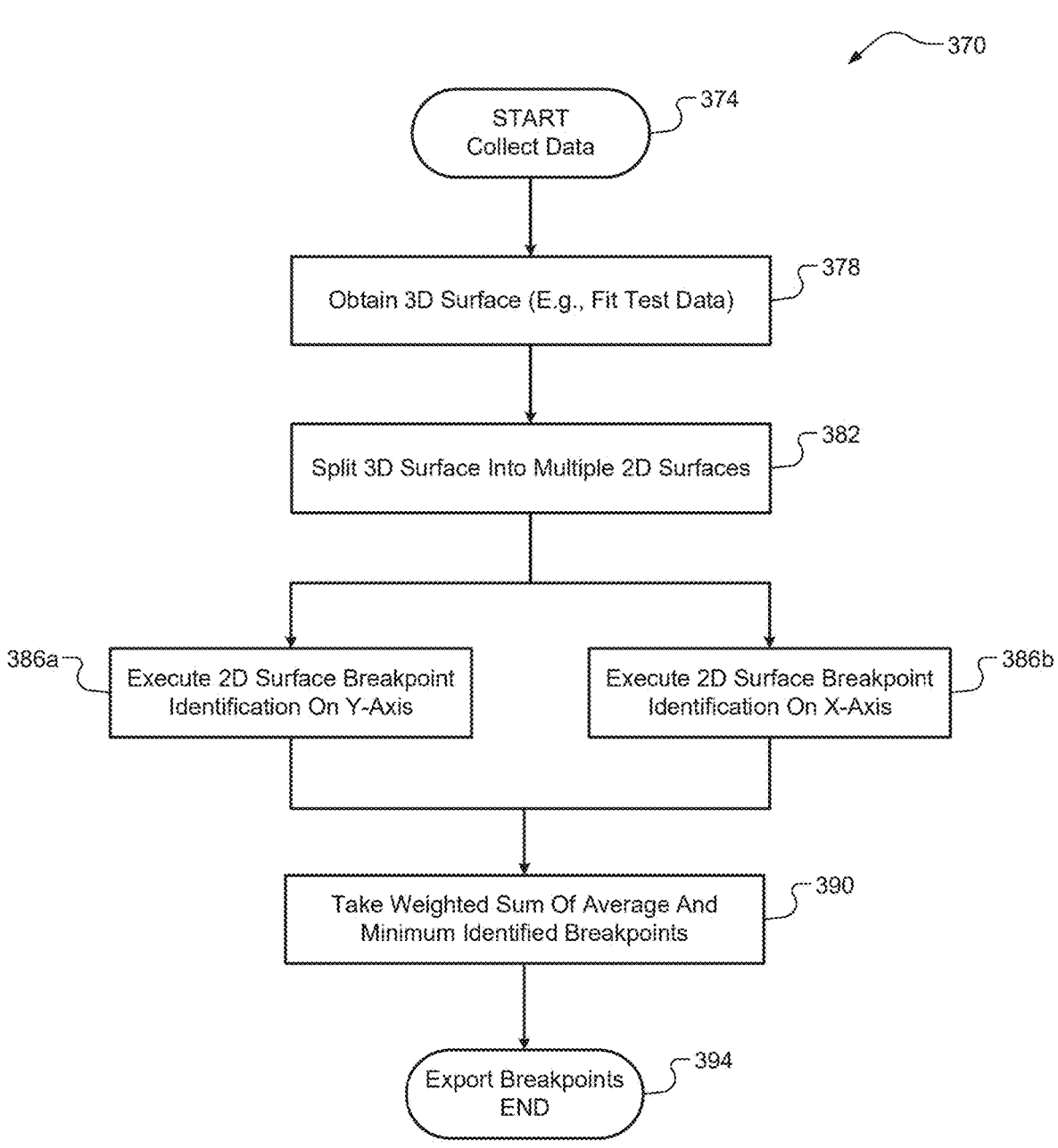
FIG. 3B is a flow diagram of an example three-dimensional (3D) surface breakpoint identification method according to the principles of the present application.

Referring now to FIG. 3B, a flow diagram of an example 3D surface breakpoint identification method 370 according to the principles of the present application is illustrated. The method 370 begins at 374 where the computer system 104 collects the operation data (i.e., the plurality of data points), which could be already stored at the memory 108. At 378, the computer system 104 obtains or fits the data to a 3D surface. At 382, the computer system 104 divides or splits the 3D surface into a plurality of 2D surfaces (e.g., spaced apart by acceptable spacing and collectively representing the 3D surface). The method 370 then splits into parallel processes including a first process 386a where the computer system 104 executes the 2D surface breakpoint identification method 300 on the Y-axis and a second process 386b where the computer system 104 executes the 2D surface breakpoint identification method 300 on the X-axis. While shown as parallel processes, it will be appreciated that these processes 386a and 386b could be performed sequentially. After both 386a and 386b, the method 370 proceeds to 390. At 390, the computer system 104 takes a weighted sum of an average and a minimum of the identified breakpoints from 386a and 386b. The method 300 then proceeds to 394 where the breakpoints are exported (e.g., to a calibrated look-up table) and the method 370 ends.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A calibration system for a multi-dimensional surface for functional safety verification of a control system of a vehicle, the calibration system comprising:
   a memory configured to store operation data relative to the control system of the vehicle, the operation data representing a multi-dimensional surface comprising a plurality of data points;
   a computer system configured to:
      identify a plurality of breakpoints for representing the multi-dimensional surface based on a maximum allowable number of breakpoints, instantaneous data point slopes, and minimum/maximum breakpoint spacing constraints; and
      generate a calibrated look-up table for the control system, the calibrated look-up table including the plurality of breakpoints, wherein the calibrated look-up table is configured to be utilized for functional safety verification of an output of the control system; and
   the control system of the vehicle, wherein the control system is configured to:
      receive, from the computer system, the calibrated look-up table and store the calibrated look-up table, wherein the calibrated look-up table requires less memory storage capacity than all possible outputs of a neural network model executable by the vehicle;
      control operation of the vehicle including generating, based on the neural network model, the output; and
      during the operation of the vehicle, utilize the calibrated look-up table to determine whether the output satisfies a functional safety verification.

2. The calibration system of claim 1, wherein:
   the output is a primary output generated by the control system during the operation of the vehicle based on the neural network model; and
   the control system is configured to determine whether the output satisfies the functional safety verification by generating a secondary output using the calibrated look-up table and determining whether the primary and secondary outputs are sufficiently similar,
   wherein the use of the calibrated look-up table for the functional safety verification of the primary output reduces a processing load on the control system by eliminating a need for a secondary execution of the neural network model to obtain the secondary output.

3. The calibration system of claim 1, wherein the computer system is further configured to identify the plurality of breakpoints by (i) determining a minimum/maximum step and a slope deviation for identifying a breakpoint.

4. The calibration system of claim 3, wherein the computer system is further configured to identify the plurality of breakpoints by (ii) determining an instantaneous slope at a first data point and creating a line with the determined instantaneous slope through the first data point.

5. The calibration system of claim 4, wherein the computer system is further configured to identify the plurality of breakpoints by (iii) stepping to a second data point and comparing a Y-value of the second data point to a Y-value of the created line.

6. The calibration system of claim 5, wherein the computer system is further configured to identify the plurality of breakpoints by (iv) identifying the first data point as a breakpoint when the difference between the Y-values of the second data point and the created line is greater than the slope deviation.

7. The calibration system of claim 6, wherein the computer system is further configured to identify the plurality of breakpoints by continuing identifying breakpoints until the maximum number of breakpoints have been identified.

8. The calibration system of claim 3, wherein the multi-dimensional surface is a two-dimensional (2D) surface.

9. The calibration system of claim 3, wherein the multi-dimensional surface is a three-dimensional (3D) surface, and wherein the computer system is further configured to divide the 3D surface into a plurality of 2D surfaces.

10. The calibration system of claim 9, wherein the computer system is further configured to:

identify the plurality of breakpoints for each of the plurality of 2D surfaces; and determine a plurality of breakpoints for the 3D surface by calculating a weighted sum of an average and a maximum of the plurality of breakpoints for the plurality of 2D surfaces, respectively.

11. A calibration method for a multi-dimensional surface for functional safety verification of a control system of a vehicle, the calibration method comprising:

accessing, by a computer system, a memory configured to store operation data relative to the control system of the vehicle, the operation data representing a multi-dimensional surface comprising a plurality of data points;

identifying, by the computer system, a plurality of breakpoints for representing the multi-dimensional surface based on a maximum allowable number of breakpoints, instantaneous data point slopes, and minimum/maximum breakpoint spacing constraints;

generating, by the computer system, a calibrated look-up table for the control system, the calibrated look-up table including the plurality of breakpoints, wherein the calibrated look-up table is configured to be utilized for functional safety verification of an output of the control system;

receiving, by the control system of the vehicle and from the computer system, the calibrated look-up table and storing, by the control system, the calibrated look-up table, wherein the calibrated look-up table requires less memory storage capacity than all possible outputs of a neural network model executable by the vehicle;

controlling, by the control system, operation of the vehicle including generating, based on the neural network model, the output; and during the operation of the vehicle, utilizing, by the control system, the calibrated look-up table to determine whether the output satisfies a functional safety verification.

12. The calibration method of claim 11, wherein:

the output is a primary output generated by the control system during the operation of the vehicle based on the neural network model; and the determining of whether the output satisfies the functional safety verification comprises generating, by the control system, a secondary output using the calibrated look-up table and determining, by the control system, whether the primary and secondary outputs are sufficiently similar, wherein the use of the calibrated look-up table for the functional safety verification of the primary output reduces a processing load on the control system by eliminating a need for a secondary execution of the neural network model to obtain the secondary output.

13. The calibration method of claim 11, further comprising identifying the plurality of breakpoints by (i) determining, by the computer system, a minimum/maximum step and a slope deviation for identifying a breakpoint.

14. The calibration method of claim 13, further comprising identifying the plurality of breakpoints by (ii) determining, by the computer system, an instantaneous slope at a first data point and creating, by the computer system, a line with the determined instantaneous slope through the first data point.

15. The calibration method of claim 14, further comprising identifying the plurality of breakpoints by (iii) stepping, by the computer system, to a second data point and comparing, by the computer system, a Y-value of the second data point to a Y-value of the created line.

16. The calibration method of claim 15, further comprising identifying the plurality of breakpoints by (iv) identifying, by the computer system, the first data point as a breakpoint when the difference between the Y-values of the second data point and the created line is greater than the slope deviation.

17. The calibration method of claim 16, further comprising identifying, by the computer system, the plurality of breakpoints by continuing identifying breakpoints until the maximum number of breakpoints have been identified.

18. The calibration method of claim 13, wherein the multi-dimensional surface is a two-dimensional (2D) surface.

19. The calibration method of claim 13, wherein the multi-dimensional surface is a three-dimensional (3D) surface, and wherein the method further comprises dividing, by the computer system, the 3D surface into a plurality of 2D surfaces.

20. The calibration method of claim 19, further comprising:

Identifying, by the computer system, the plurality of breakpoints for each of the plurality of 2D surfaces; and determining, by the computer system, a plurality of breakpoints for the 3D surface by calculating a weighted sum of an average and a maximum of the plurality of breakpoints for the plurality of 2D surfaces, respectively.

* * * * *